(No Model.)
M. CARR.
CRUSHER AND PULVERIZER.
No. 392,537. Patented Nov. 6, 1888.
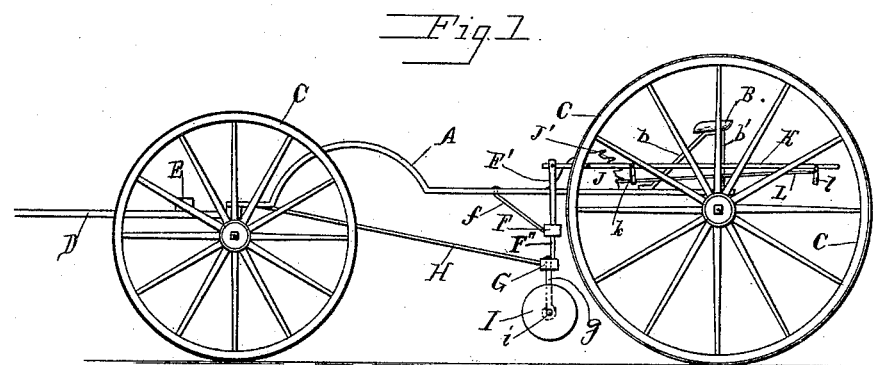
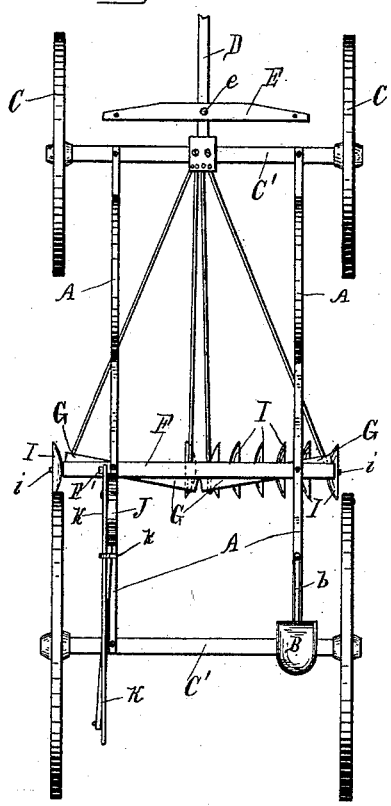
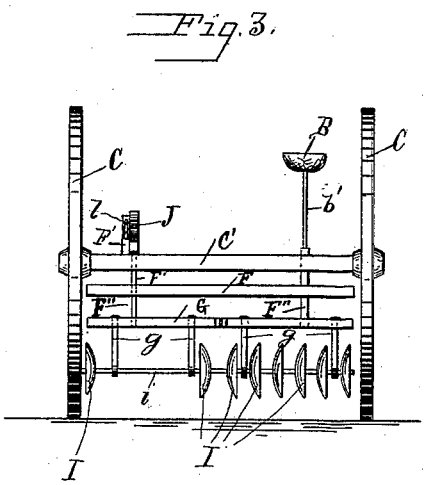
Witnesses.
R. A. Balderson
F. T. Campbell
Inventor:
Michael Carr,
By E. H. Selden.
His Attorney.

UNITED STATES PATENT OFFICE.

MICHAEL CARR, OF TALLMADGE, MICHIGAN.

CRUSHER AND PULVERIZER.

SPECIFICATION forming part of Letters Patent No. 392,537, dated November 6, 1888.

Application filed June 29, 1888. Serial No. 278,537. (No model.)

*To all whom it may concern:*

Be it known that I, MICHAEL CARR, a citizen of the United States, residing at Tallmadge, in the county of Ottawa and State of Michigan, have invented certain new and useful Improvements in Crushers and Pulverizers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to clod crushers and pulverizers, and its objects are, first, to effect a thorough breaking up of the soil, and thus improve its receptive capacity for the seed; second, to provide means for obviating the interference of natural obstructions with the operation of the machine; third, to secure and maintain a variable depth of furrow, and, fourth, to attain these ends with structural simplicity and economy. I accomplish these ends by the mechanism shown in the accompanying drawings, in which—

Figure 1 represents a side elevation of a crusher embodying the essential elements of my invention. Fig. 2 is a plan view thereof, and Fig. 3 is an end elevation of the same.

The same designations indicate corresponding parts in all the views.

In sowing crops the lodgment and fructification of the seed is in direct proportion to the receptivity of the soil and its acquired or inherent strength. To comminute the soil is an essential step to this end, and to the thorough and economical accomplishment thereof my invention is addressed.

Mounted upon suitable wheels, C, having axles C', a shaft, D, and a doubletree, E, held by king-bolt e, are the frame-bars or upper beams, A, preferably curved forwardly, on which the seat B is mounted by rod $b'$ and stay $b$. A shaft, $i$, carrying disk crushers I, is suspended from rods $g$, which are secured by suitable nuts to the divided cross-bar G, which permits one series of the crushers to be used together with or separately from the other, stayed by rod H from the frame-bars A. This cross-bar in turn depends from the lever K by means of the rods F' F'', which oscillate in the perforated frame F, stayed by rods $f$ when so actuated by said lever. A segment, J, having serrations J', serves to hold adjustably the ratchet-bar L, which is connected to the lever K by guide-frames $k$ $l$, and whereby any horizontal altitude of the crushers I is secured and maintained.

It will be understood that by the manipulation of lever K the depth of furrows can be regulated from the seat.

Having thus fully described my improvements, what I claim is—

In clod and earth crushers, the running-gear, in combination with the curved frame or beam A, having a seat, B, the cross-bars F G, the latter of which is divided to permit the two series of crushers to operate separately or unitedly, the reciprocating rods F' F'', whose ends are attached, respectively, to the divided cross-bar G and to the lever K, the disks I, mounted on shaft $i$, rigidly suspended from the bars G by rods $g$, and the serrated segment J, in which the lever $k$ is fulcrumed and whose dentations serve to hold the ratchet-bar L adjustably, whereby the altitude of the crushers is variable and one set caused to operate either independently of or conjointly with the other set, for the purpose set forth, and in the manner herein fully shown and described.

In testimony whereof I affix my signature in presence of two witnesses.

MICHAEL CARR.

Witnesses:
HENRY G. SAUNDERS,
MANVILLE H. BRIGGS.